United States Patent
Adams, Jr. et al.

[11] Patent Number: 6,136,085
[45] Date of Patent: Oct. 24, 2000

[54] SILICA-COATED ALKALINE EARTH METAL CARBONATE PIGMENT

[75] Inventors: Charles Adams, Jr.; Jerry Allen Cook, both of Cartersville, Ga.

[73] Assignee: Chemical Products Corporation, Cartersville, Ga.

[21] Appl. No.: 09/183,330

[22] Filed: Oct. 29, 1998

[51] Int. Cl.[7] ..................................................... C09C 1/02
[52] U.S. Cl. ...................... 106/463; 106/465; 106/482; 423/430; 428/404
[58] Field of Search ..................................... 106/465, 463, 106/482; 423/430; 428/404

[56] References Cited

U.S. PATENT DOCUMENTS

| | | | |
|---|---|---|---|
| 4,167,423 | 9/1979 | Williams | 106/431 |
| 4,374,178 | 2/1983 | Kulkarni et al. | 428/404 |
| 5,000,791 | 3/1991 | Tokarz et al. | 106/463 |
| 5,037,477 | 8/1991 | Tokarz et al. | 106/464 |
| 5,164,006 | 11/1992 | Chapnerkar et al. | 106/465 |

FOREIGN PATENT DOCUMENTS

| | | | |
|---|---|---|---|
| 44-7364 | 4/1969 | Japan | 106/465 |
| 55-113619 | 9/1980 | Japan | 106/465 |
| 60-72963 | 4/1985 | Japan | 106/465 |
| 1279989 | 12/1986 | U.S.S.R. | 106/465 |

*Primary Examiner*—Anthony Green

[57] ABSTRACT

A method for forming a silica coating on at least a portion of the surface of alkaline earth metal carbonate particulates in aqueous suspension and the silica-coated alkaline earth metal carbonate so produced are claimed. The claimed method consists of allowing soluble silicate ions in the aqueous phase to slowly react with the alkaline earth metal carbonate surface to form silica micro-particulates on the surface. This silica coating confers upon the composition unique properties among which are pronounced thixotropic behavior when incorporated into an aqueous suspension and increased oil absorption when dry. The pigment produced by this method is especially suited for use as a filler in paper.

7 Claims, No Drawings

SILICA-COATED ALKALINE EARTH METAL CARBONATE PIGMENT

The present invention relates to a process for the preparation of alkaline earth metal carbonate particles, most particularly calcium carbonate particles, possessing at least a partial surface coating of silica or insoluble silicate micro-particulates. This at least partial coating substantially changes the rheological characteristics of an aqueous suspension of the particles, decreases the tapped bulk density of the particles in dry powder form, and increases the oil absorption of the particles most probably by creating a rougher particle surface containing voids between the silica micro-particulates on the surface. The thixotropy demonstrated by an aqueous suspension of the product of the present invention increases the utility of the material as a protective coating ingredient, that is, an ingredient of paints, or as a component of consumer cleaning products, such as the low-abrasion bathtub cleaners which utilize calcium carbonate as a significant component and which also contain organic polymers or other additives to make the composition highly thixotropic. As used herein, the term "pigment" is defined as a finely-divided particulate solid which may be employed to impart color, opacity, or volume to a filled system. The increased oil absorption of the product of the present invention increases its utility as a pigment incorporated into printing and writing papers which are designed to have specific ink absorption characteristics; the increased oil absorption of the pigment is a direct indication that it will impart improved ink absorption characteristics to the paper into which it is incorporated.

BACKGROUND OF THE INVENTION

This invention relates to a method for preparing alkaline earth metal carbonates, particularly calcium carbonates, with improved properties for use as fillers or pigments in paper, paints, plastics, and household cleaners. Most particularly, this invention relates to improving the properties of natural ground calcium carbonate suspensions for use as fillers in paper and paints.

Many paper mills have converted to neutral or alkaline papermaking in the past two decades because this has offered them a number of advantages; among these is the opportunity to reduce pigment costs by replacing some of the expensive titanium dioxide used as a filler in papermaking with less expensive calcium carbonate pigment. The term "filler" is employed to refer to a pigment which is admixed with wood pulp in an aqueous suspension immediately prior to the dewatering of the pulp and pigment admixture to form a sheet of paper. Calcium carbonate, particularly precipitated calcium carbonate (PCC), is being used as a filler pigment in the making of paper; natural ground calcium carbonate (GCC) is being used in North America predominantly as a coating pigment while it is also used as a paper filler pigment in Europe. Both types of calcium carbonate pigments lack the physical properties which would allow papermakers to completely eliminate the use of more expensive pigments such as titanium dioxide or synthetic amorphous silicas and silicates. The GCC products are generally considered to be inferior to scalenohedral PCC for use as fillers for paper because their generally spherical particle morphologies do not scatter light as efficiently as the rosette-shaped PCC particles which contain many micro-voids.

The spherical GCC particles pack together very efficiently and can be dispersed to form a fluid suspension at relatively high solids concentrations. GCC is sold to the paper industry predominantly as an anionically-dispersed 75% to 76% solids suspension of fine particles because this form is free of dust, can be pumped, requires a small storage volume compared to other forms, and is less energy-intensive to produce and distribute than other forms.

PCC is generally provided to the paper mill as a dry powder or as a 20% to 30% aqueous suspension from a "satellite" PCC production facility located immediately adjacent to the paper mill.

Economic benefits would be realized by the paper manufacturer if scalenohedral PCC could be inexpensively modified to allow it to be used as a greater proportion of the overall filler pigment admixture within speciality papers. Economic and environmental benefits would be realized if GCC could be inexpensively modified to make it an acceptable paper-filling pigment when used at high filler levels in printing and writing papers; an evaluation conducted as a result of EC Directive 1836/93, the EC Eco-Audit Directive, found GCC to be less energy intensive in its production and distribution to the paper mill than PCC.

Improvement in the specific pigment physical properties of ink absorption, opacity, and first pass retention (retention of the pigment in the paper sheet when it is formed from the pulp suspension) would allow papermakers to use a greater proportion of calcium carbonate filler in paper thus reducing their use of other, more expensive fillers.

In addition to prior art concerning the production of both GCC and PCC pigments, several patents teach modification of the surface of calcium carbonate particles to make them more acceptable for use as filler pigments under weakly acidic papermaking conditions.

A variety of techniques to modify calcium carbonate to achieve a degree of acid resistance have been patented. U.S. Pat. No. 5,037,477 discloses precipitating a coating on calcium carbonate particles by simultaneously adding to an aqueous suspension of calcium carbonate particles, at an elevated temperature, a solution of a water-soluble silicate and a solution of a water soluble zinc compound so as to precipitate a coating onto the particle surfaces very rapidly; U.S. Pat. No. 5,043,017 discloses adding a calcium chelating agent or a conjugate base and a weak acid into an aqueous suspension of calcium carbonate particles such that the calcium carbonate particles are coated by and in equilibrium with the additives; U.S. Pat. No. 5,531,821; 5,584,923; 5,593,488; 5,593,489; 5,599,388; and 5,647,902 also disclose processes for rendering calcium carbonate particles more acid-resistant but do not employ silica.

U.S. Pat. No. 5,514,212 teaches the use of a calcium carbonate pigment which has a starch-soap complex precipitated onto the particle surface so as to improve the efficiency of sizing agents added to the wood pulp and pigment admixture during the papermaking process.

OBJECTS OF THE INVENTION

It is an object of the present invention to provide a process for the preparation of a ground calcium carbonate (GCC) which is especially suitable for use as a filler in the papermaking process.

It is a further object of the present invention to provide a process for the preparation of an alkaline earth metal carbonate composition which demonstrates substantial thixotropy when incorporated into an aqueous suspension for use as a paint or household cleaning composition.

A still further object of the present invention is to provide a process for the preparation of a precipitated calcium carbonate (PCC) with enhanced properties for use as a filler in the papermaking process.

A still further object of the present invention is to provide a process for the improvement of commercial GCC slurry products for paper filling applications which process can be practiced at the location where the paper is manufactured and subsequent to the transportation of an aqueous suspension of fine calcium carbonate particles containing about 75% to 76% solids by weight from its place of manufacture to the paper manufacturing facility so as to maintain the economic and ecological advantages of these GCC slurry products while increasing their utility.

Yet another object of the present invention is to provide a process for the improvement of the suitability of commercial PCC products produced at "satellite" facilities for paper filling applications such that the process can be practiced after the PCC product has been supplied to the paper mill.

SUMMARY OF THE INVENTION

A method is disclosed for preparing an alkaline earth metal carbonate composition consisting of alkaline earth metal carbonate particles with an average particle size between about 0.8 microns and about 20 microns and having at least a portion of the surface of said alkaline earth metal carbonate particles covered by a silica species which has been precipitated thereon so as to substantially alter the physical properties of the particles so as to make them more suitable for use in paints, cleaning compositions, and as a filler pigment in paper. Surprisingly, it has been discovered that an insoluble silicate species will be precipitated onto the surface of alkaline earth metal carbonate particles slowly over a period of about 24 hours at ambient temperature from a concentrated aqueous suspension of insoluble alkaline earth metal carbonate particles admixed with soluble alkali metal silicate; this is accomplished without the addition of any foreign cations or acid to the admixture. The present invention yields an alkaline earth metal carbonate composition which has a lower tapped bulk density and an increased oil absorption capability, compared to the alkaline earth metal carbonate powder prior to the practice of the present invention. When a commercially-available sodium silicate solution, such as CHEM-SILATE 41A produced by Chemical Products Corporation, is admixed with an aqueous suspension of alkaline earth metal carbonate particles at ambient temperature, an increase in the low-shear viscosity of the suspension becomes apparent beginning about 30 minutes after the addition of the soluble silicate solution and becomes more pronounced with the passage of time with marked thixotropy developing to such an extent that the suspension may assume the appearance of a solid under conditions of zero shear depending upon the amount of water present in the admixture. The development of this pronounced thixotropic behavior of the aqueous suspension is highly desirable for the incorporation of this composition into paints and household cleaning products. This marked thixotropic rheological behavior is believed to be the result of a high degree of interparticle attraction resulting from hydrogen bonding between silica particles attached to the surfaces of different alkaline earth metal carbonate particles. Hydrogen bonding capability can be employed to aid in the retention of these particles in a paper sheet during the papermaking process through the formation of hydrogen bonds between the particles and wood pulp fibers. Commercially-available anionically-dispersed natural ground calcium carbonate suspensions, typically used by the paper industry as paper coating pigments, are improved through the practice of the present invention such that they can be employed as pigments for paper filling because of their increased retention in the paper sheet when it is formed on the paper machine.

DETAILED DESCRIPTION OF THE INVENTION

The improved form of alkaline earth metal carbonate prepared by the present invention is composed of alkaline earth metal carbonate particles at least partially covered by a silica or silicate surface coating formed over a period of at least about 30 minutes and preferably at least about 4 hours after a water-soluble silicate solution is added with stirring to a concentrated aqueous suspension of alkaline earth metal carbonate particles at ambient temperature. While not wishing to be bound by any particular theory as to the operability of the present invention, it is believed that the increased oil absorption conferred upon the alkaline earth metal carbonate compositions of the present invention can be explained as the result of the chemisorption of soluble silica species onto the carbonate surface followed by polymerization of the silica present in the solution to form nanometer-sized silica particles attached to the alkaline earth metal carbonate surface which may grow further over time depending upon the amount of silicate in solution. In many applications the presence of soluble silicate is undesirable, so subsequent to the growth of silica particles on the surface of alkaline earth metal carbonate particles, any remaining soluble silicate would preferably be precipitated by any of the prior art methods well known to those skilled in the art. The hydrogen bonding that occurs between silica particles results in the phenomenon of three dimensional silica gel networks; this gel formation occurs only between silica particles and not water-soluble silicate species, therefore the onset of thixotropy during the practice of the present invention represents the appearance of silica particles on the surface of the alkaline earth metal carbonate particles due to precipitation or polymerization of the water-soluble silicate species into silica particles. This precipitation or polymerization is unexpected because it occurs without the addition of any foreign cations or acid species, and is believed to result in a surface coating of highly structured silica particles because it proceeds slowly over a period of at least many minutes and preferably over a period of many hours.

It is believed that under the circumstances existing in the practice of the present invention, the distinction becomes blurred between silica, a compound composed solely of the elements silicon and oxygen, and silicate, an ionic compound containing an anionic component which is composed of silicon and oxygen. The term "silica" as used herein is meant to encompass both when describing the solid phase on the surface of alkaline earth metal particles.

U.S. Pat. No. 5,037,477, discussed previously, teaches in Examples 3 and 6 that the acid resistance of the claimed calcium carbonate product is reduced if the soluble silicate is added prior to a foreign cation which precipitates the silicate; it is believed that the present invention yields a silica-coated surface which is not uniform as required for optimum acid resistance, but rather is microscopically rough because of the formation of silica particulates around chemisorbed silicate species on the surface. Chapter 12, "High-Structure Amorphous Silica Pigments in Paper", in Pigments for Paper, TAPPI Press, 1997, presents the polymerization behavior of silica; it states, "High-structure amorphous silicas have unique structures, and there still exists a degree of art in synthesizing the various structures that are commercially available." It is believed that the means of synthesizing yet another unique silica structure is herein disclosed.

In a preferred embodiment of the present invention, an anionically-dispersed GCC slurry containing 76% calcium carbonate and 24% water is agitated at ambient temperature while a solution of an alkali metal silicate is added such that 0.5% to 20%, preferably 3% to 10%, silica is added based on the dry weight of the calcium carbonate. At least 24 hours after admixing the GCC slurry and the alkali metal silicate, any remaining water-soluble silicate may be removed from solution by either washing of the particulates or, more preferably, by addition of a foreign cation or an acid to precipitate said silicate.

The invention will be further illustrated by the following examples which are to be considered illustrative but not limiting in their presentation of precise embodiments of the present invention.

EXAMPLE 1
Demonstration of the Permanence of the Silica Coating Formed by the Practice of the Present Invention A sample of HYDROCARB® 90 (H90) anionically-dispersed natural ground calcium carbonate aqueous suspension containing 76% calcium carbonate by weight, produced by Omya Incorporated, was admixed with 10% by weight CHEM-SILATE® 42A sodium silicate solution produced by Chemical Products Corporation, based on the weight of the HYDROCARB® suspension, this is 3.8% silica based on the dry weight of calcium carbonate. The admixture was diluted with 10% water based on the weight of the H90 suspension after one hour, and with 20% water after 24 hours, to maintain a workable consistency; the objective was to maintain the fluidity of the suspension under conditions of moderate shear. No foreign ions were added to the admixture. After 76 hours the aforesaid admixture was diluted with water to form a very dilute suspension containing less than 1% suspended solids. After 2 days equilibration time, the elemental composition of the material on and immediately under the surface of the particles was determined by energy dispersive spectroscopy. The aforesaid admixture which is the product of the present invention was found to contain 8.5% silica by weight in the material composing the surface layer on the particles, whereas the initial H90 sample was analyzed by the same means and found to have no detectable silica in its surface layer.

EXAMPLE 2
Oil Absorption Determination by the Spatula Rub-Out Method

Samples of HYDROCARB® 90 (H90) anionically-dispersed calcium carbonate slurry produced by Omya Incorporated and CARBITAL® 90 (C90) anionically-dispersed calcium carbonate slurry produced by ECC Americas, Inc. were each admixed with 9% by weight CHEM-SILATE® 41A (41A) sodium silicate solution produced by Chemical Products Corporation, based on the weights of the calcium carbonate slurries, according to the practice of the present invention; this is about 3.5% by weight of silica based on the dry weight of the calcium carbonate in each case. After the admixtures were allowed to react for about 50 hours, each sample was further admixed with a dilute magnesium sulfate solution such that about 1.5% magnesium was added by weight based on the weights of the initial calcium carbonate slurries; this was done to insure that no soluble silicate remained in the aqueous phase which might act to cement the calcium carbonate particles together during drying. The products of the present invention as well as samples of the initial calcium carbonate slurries were then oven dried and the dried samples were crushed to fine powders in a mortar and pestle. Spatula rub-out oil absorption measurements on the four samples using linseed oil were as follows:

HYDROCARB® 90 39 cc/100 grams

Silica-coated HYDROCARB® 90 56 cc/100 grams

CARBITAL® 90 33 cc/100 grams

Silica-coated CARBITAL® 90 45 cc/100 grams

If the increased oil absorption were attributed solely to internal void volume or porosity of the silica coating on the calcium carbonate particle surfaces, that silica would be exhibiting an oil absorption of about 500 cc/100 grams of silica and about 350 cc/100 grams of silica, respectively, in the two above-described cases. "Synthetic Amorphous Silicas and Silicates in the Paper Industry" in the 1995 TAPPI Dyes, Fillers, and Pigments Short Course—Course Notes (TAPPI Press, 1995) reports that oil absorption values for highly structured commercial precipitated silica and silicate products are on the order of about 200 cc/100 grams of silica. It is speculated that the remarkable increase in the oil absorption of the products of the present invention can be attributed to areas between fixed silica micro-particulates on the surface of the calcium carbonate particles acting as voids which can contain oil.

EXAMPLE 3
Tapped Bulk Density Determinations

The four powder samples described in Example 2 were each weighed and placed in graduated cylinders which were each dropped from a height of one inch onto their bases 100 times to compact the powder within; after this compaction by "tapping" the volume occupied by the powder was recorded. The tapped bulk densities of the four samples were calculated to be:

| | |
|---|---|
| HYDROCARB® 90 | 1.09 g/cc |
| Silica-coated HYDROCARB® 90 | 0.828 g/cc |
| CARBITAL® 90 | 0.981 g/cc |
| Silica-coated CARBITAL® 90 | 0.791 g/cc |

The products of the present invention are "bulkier" than the calcium carbonate powders from which they were formed. The volume occupied by one gram of each powder is calculated as the inverse of the tapped bulk density; the volume occupied by the same weight of powder is increased by 31.5% and 23.5%, respectively, in the above two cases. This "bulkiness" would be expected to enhance a filler's performance in a paper sheet.

EXAMPLE 4
Retention of Fillers in Laboratory-Prepared Paper Sheets

Admixtures were prepared as described in Example 2 from H90 and C90. In addition, a sample of H90 was admixed with 25% CHEM-SILATE® 41A sodium silicate solution based on the weight of the H90 suspension; after about 50 hours reaction time and dilution with water to maintain fluidity, carbon dioxide gas was bubbled into the admixture with stirring until the pH of the admixture dropped to about 9 as a means of removing all remaining silicate ions from solution. All samples were submitted as aqueous suspensions to a specialized paper testing laboratory.

Five samples were evaluated as paper fillers by preparing paper handsheets in the laboratory incorporating each sample separately as the filler in the paper; each sample was added to the furnish at the 15% and 20% loadings based on the dry weight of the pulp. The ash contents of the resulting handsheets were measured to determine how much of the filler remained in the paper with the wood pulp. The products of the present invention were retained in the sheets to a greater extent than the calcium carbonate slurries from which they were prepared when hadnsheets were prepared under identical conditions in the laboratory. The following ash contents were reported:

Percent ash based on the weight of the dry paper

| | 15% added filler | 20% added filler |
|---|---|---|
| H90 | 2.11 | 3.43 |
| H90 + 9% 41A | 4.83 | 7.67 |

|  | 15% added filler | 20% added filler |
|---|---|---|
| H90 + 25% 41A | 5.68 | 9.06 |
| C90 | 3.12 | 4.24 |
| C90 + 9% 41A | 5.84 | 6.19 |

EXAMPLE 5
TAPPI Opacity (89% Reflectance) of the Laboratory-Prepared Papers

Papers containing C90 and the product of the present invention prepared from C90 as described in Example 4 were tested according to Trade Association of the Pulp and Paper Industry (TAPPI) Test Method T-425 to determine their opaqueness. Five paper samples were prepared and tested for each filler sample with the filler loading at 15% by weight dry filler based on the dry weight of the pulp. The average opacities and standard deviations over the five paper samples tested for each filler sample were:

|  | Average opacity | Standard deviation |
|---|---|---|
| C90 | 78.7 | 0.32 |
| C90 + 9% 41A | 81.8 | 0.27 |

This is a significant improvement in the opacity of the paper sheets.

EXAMPLE 6
Brookfield Heliopath Viscosity Measurements

To demonstrate the unique and surprising thixotropic behavior resulting from the practice of the present invention, two admixtures were prepared from a sample of H90 calcium carbonate suspension. While the two admixtures were prepared utilizing exactly the same ingredients in exactly the same amounts, Admixture A is the product of the present invention and Admixture B is intended to be a simple mixture of silica gel and calcium carbonate particles.

Admixture A was prepared by admixing 408 grams of H90 slurry and 38 grams of CHEM-SILATE® 41A sodium silicate solution at ambient temperature, adding 41 grams of water with stirring after about one hour as the viscosity of the admixture began to increase significantly, and finally adding 6.5 grams of anhydrous magnesium sulfate dissolved in 144 grams of water with stirring after 26 hours. Admixture B was prepared by admixing 38 grams of CHEM-SILATE® 41A sodium silicate solution with 6.5 grams of anhydrous magnesium sulfate dissolved in 185 grams of water, and finally, after about 26 hours, adding 408 grams of H90 slurry with stirring to the semi-solid, gelatinous silica suspension which had formed.

The low-shear viscosities of these admixtures were measured utilizing a Brookfield viscometer equipped with a T-bar spindle and a Heliopath attachment after the compositions had been allowed to stand without being stirred for 5 minutes. The viscosities were as follows:

| Admixture A | 0.5 rpm | 139,600 centipoise |
|---|---|---|
|  | 2.5 rpm | 30,800 centipoise |
|  | 10 rpm | 6600 centipoise |
| Admixture B | 0.5 rpm | 53,200 centipoise |
|  | 2.5 rpm | 15,200 centipoise |
|  | 10 rpm | 4880 centipoise |

After the abovesaid admixtures had been allowed to stand for 30 minutes without being stirred, the viscosity of Admixture A was measured at 0.5 rpm to be 230,000 centipoise and the viscosity of Admixture B was measured at 0.5 rpm to be 58,000 centipoise.

The HYDROCARB® 90 sample used to prepare the abovesaid admixtures was measured in the same manner as above and found to have viscosities of 2000 centipoise, 1120 centipoise, and 800 centipoise at 0.5 rpm, 2.5 rpm, and 10 rpm, respectively.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

We claim:

1. A method for preparing an alkaline earth metal carbonate composition composed of alkaline earth metal carbonate particles having surfaces at least partially covered with silica comprising the steps of:

(a) forming an aqueous suspension of the alkaline earth metal carbonate;

(b) admixing said alkaline earth metal carbonate aqueous suspension with an aqueous solution of alkali metal silicate in an amount such that from about 0.5 to about 20 weight percent silica based on the dry weight of the alkaline earth metal carbonate is present in the admixture; and (c) allowing said admixture to react for at least about 30 minutes.

2. The method of claim 1 wherein the alkaline earth metal carbonate is calcium carbonate.

3. The method of claim 1 wherein the aqueous solution of alkali metal silicate is sodium silicate solution.

4. Alkaline earth metal carbonate particles with surfaces at least partially covered with silica produced by the process of claim 1.

5. Calcium carbonate particles with surfaces at least partially covered with silica produced by the process of claim 2.

6. Calcium carbonate particles with surfaces at least partially covered with silica produced by the process of claim 2 in which the alkaline earth metal carbonate aqueous suspension in step (a) is an anionically-dispersed suspension of ground marble or ground calcite.

7. Silica-coated calcium carbonate produced by (a) forming an aqueous suspension of calcium carbonate particles; (b) admixing said aqueous suspension of calcium carbonate particles with an aqueous solution of alkali metal silicate in an amount such that from about 0.5 to about 20 weight percent silica based on the dry weight of the calcium carbonate particles is present in the admixture; and (c) allowing said admixture to react for at least about 30 minutes.

* * * * *